(12) United States Patent
Bogineni et al.

(10) Patent No.: US 11,582,633 B2
(45) Date of Patent: *Feb. 14, 2023

(54) INTEGRATION OF RADIO AND CORE LAYERS

(71) Applicant: Verizon Patent and Licensing Inc., Basking Ridge, NJ (US)

(72) Inventors: Kalyani Bogineni, Hillsborough, NJ (US); Sudhakar Reddy Patil, Flower Mound, TX (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 49 days.

This patent is subject to a terminal disclaimer.

(21) Appl. No.: 17/223,304

(22) Filed: Apr. 6, 2021

(65) Prior Publication Data

US 2021/0227423 A1 Jul. 22, 2021

Related U.S. Application Data

(63) Continuation of application No. 16/449,523, filed on Jun. 24, 2019, now Pat. No. 10,999,756.

(51) Int. Cl.
*H04W 28/02* (2009.01)
*H04W 92/24* (2009.01)
*H04W 92/12* (2009.01)

(52) U.S. Cl.
CPC ... *H04W 28/0263* (2013.01); *H04W 28/0268* (2013.01); *H04W 92/12* (2013.01); *H04W 92/24* (2013.01)

(58) Field of Classification Search
CPC ......... H04W 28/0263; H04W 28/0268; H04W 92/12; H04W 92/24
See application file for complete search history.

(56) References Cited

U.S. PATENT DOCUMENTS

| | | | |
|---|---|---|---|
| 10,999,756 B2 * | 5/2021 | Bogineni | .......... H04W 28/0263 |
| 2012/0033554 A1 | 2/2012 | Shiva et al. | |
| 2018/0368109 A1 | 12/2018 | Kim | |
| 2019/0075552 A1 | 3/2019 | Yu et al. | |
| 2019/0174573 A1 | 6/2019 | Velev et al. | |
| 2019/0182211 A1 | 6/2019 | Yang et al. | |
| 2019/0261249 A1 | 8/2019 | Xiong et al. | |
| 2019/0288873 A1 | 9/2019 | Camarillo Garvia et al. | |
| 2019/0372837 A1 | 12/2019 | Yang et al. | |
| 2020/0099580 A1 | 3/2020 | Yang et al. | |
| 2020/0178149 A1 | 6/2020 | Seenappa et al. | |
| 2020/0213914 A1 | 7/2020 | Shen | |
| 2020/0245182 A1 | 7/2020 | Chitta et al. | |
| 2020/0304408 A1 | 9/2020 | Suthar et al. | |

OTHER PUBLICATIONS

"PDF of metadata of NPL U indicating publication date", (Year: 2018).
Brown, et al., "5G Service Velocity & the Distributed Cloud", Heavy Reading White Paper. Mar. 23, 2018 (Year: 2018).

* cited by examiner

*Primary Examiner* — Kashif Siddiqui

(57) ABSTRACT

A method, a device, and a non-transitory storage medium are described in which a radio and core integrated layers service is provided. The service provides a direct mapping of a quality of service flow between a packet data unit layer and a service data adaptation layer associated with a user plane function and a central unit-user plane function without an intermediary mapping of a tunneling protocol in the user plane.

20 Claims, 6 Drawing Sheets

INTEGRATION OF RADIO AND CORE LAYERS

CROSS REFERENCE TO RELATED APPLICATION

This patent application is a continuation of U.S. patent application Ser. No. 16/449,523, entitled "INTEGRATION OF RADIO AND CORE LAYERS" and filed on Jun. 24, 2019, the disclosure of which is incorporated herein by reference in its entirety.

BACKGROUND

Development and design of radio access networks (RAN) and core networks present certain challenges from a network-side perspective and an end device perspective. For example, depending on the configurations from both network-side and end device-side perspectives, such configurations may reduce the effective use of resources and negatively impact various performance metrics, such as latency, etc. Accordingly, a need exists to overcome these challenges.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

A next generation or future wireless network should support various use cases, meet various performance metrics, allow for scalability and flexibility, and so forth. As a part of next generation or future generation wireless network services, quality of service (QoS) rules and policies may be mapped to user plane (UP) packets of QoS flows between an end device and a user plane function (UPF). In the context of a split wireless network architecture, a central unit-user plane (CU-UP) function may map a QoS flow and a data radio bearer, and mark a QoS flow identifier (QFI) for both uplink and downlink packets. A protocol entity of Service Data Adaptation Protocol (SDAP) may be configured for each individual packet data unit (PDU) session. Also, a General Packet Radio Service Tunneling Protocol User Plane (GTP-U) tunnel, which carries the QoS flow, has to be mapped. For example, the UPF may map a QoS flow into the GTP-U tunnel and then the CU-UP may map the QoS flow from the GTP-U tunnel to the data radio bearer. However, this framework can result in unnecessary use of network resources and negatively impact QoS metrics, such as latency.

According to exemplary embodiments, a radio and core integrated layers service is described. According to an exemplary embodiment, a user plane network device may provide the radio and core integrated layers service. According to an exemplary embodiment, the user plane network device includes logic that maps QoS flows into radio bearers with no intermediary mapping into GTP-U tunnels. According to an exemplary embodiment, the user plane network device includes PDU, SDAP, and Packet Data Convergence Protocol (PDCP) functions. According to an exemplary embodiment, the user plane network device may determine whether to invoke the radio and core integrated layers service or not based on collocation guidance information. According to an exemplary embodiment, when the radio and core integrated layers service is not invoked, a QoS flow mapped to a PDU session may be mapped to a GTP-U tunnel, as described herein.

As a result, the radio and core integrated layers service may improve network resource utilization in a network. For example, use of various network resources (e.g., physical, logical, virtual, radio) that stem from QoS flow mapping in relation to network devices of a RAN or network devices of the RAN and a core network may be reduced. Additionally, the radio and core integrated layers service may improve quality of service metrics for end device applications and services based on the elimination of GTP-U tunnel mapping.

Figure 1:
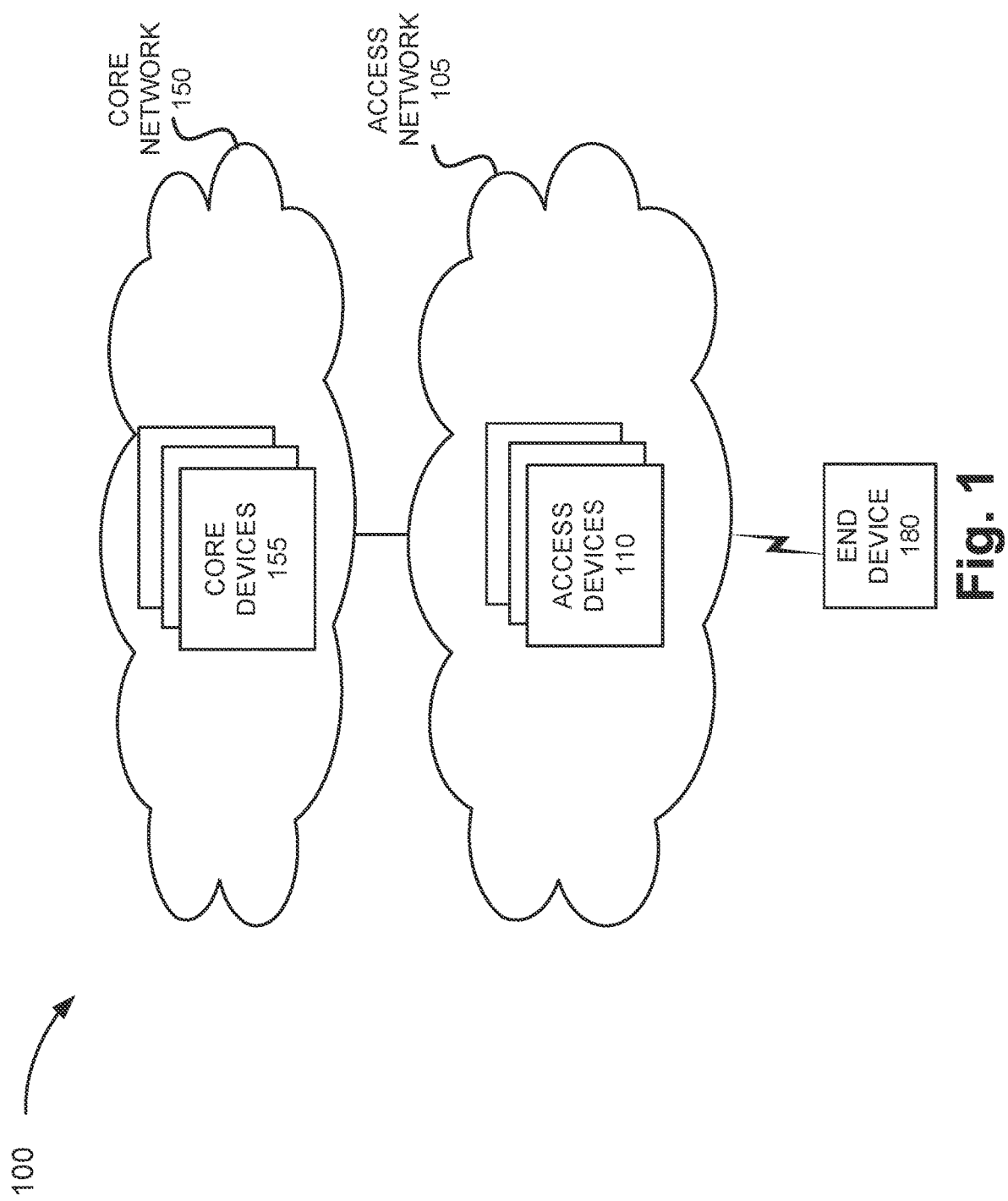
FIG. 1 is a diagram illustrating an exemplary environment in which an exemplary embodiment of a radio and core integrated layers service may be implemented.

FIG. 1 is a diagram illustrating an exemplary environment 100 in which an exemplary embodiment of the radio and core integrated layers service may be implemented. As illustrated, environment 100 includes an access network 105 and a core network 150. Access network 105 includes access devices 110, and core network 150 includes core devices 155. Environment 100 further includes an end device 180.

The number, the type, and the arrangement of network devices in access network 105 and core network 150, as illustrated and described, are exemplary. The number of end devices 180 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Network (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the network devices, and between end device 180 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the radio and core integrated layers service may use at least one of these planes of communication. Additionally, an interface of a network device (e.g., relative to an interface defined by a standards body, such as Third Generation Partnership Project (3GPP), International Telecommunication Union (ITU), European Telecommunications Standards Institute (ETSI), etc.) may be modified in order to support the communication (e.g., transmission and reception of messages, information elements (IE), attribute value pairs (AVPs), etc.) between network devices and support of the radio and core integrated layers service, as described herein. According to various exemplary implementations, the interface may be a service-based interface or a reference point-based interface.

Access network 105 may include one or multiple networks of multiple types and technologies. For example, access network 105 may include a Fourth Generation (4G) RAN, a 4.5G RAN, a Fifth Generation (5G) RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, and a next generation (NG) RAN. Access network 105 may further include other types of wireless networks, such as a WiFi network, a Worldwide Interoperability for Microwave Access (WiMAX) network, a local area network (LAN), or another type of network (e.g., a legacy Third Generation (3G) RAN, etc.) that may provide an on-ramp to access devices 110 and/or core network 150.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technologies (RATs), etc.), wireless standards, wireless frequencies/bands/carriers, licensed radio spectrum, unlicensed radio spectrum, and/or other attributes of radio communication.

Access network 105 may include different and multiple functional splitting, such as options 1, 2, 3, 4, 5, 6, 7, or 8 that relate to combinations of access network 105 and core network 150 including an Evolved Packet Core (EPC) network and/or a NG core (NGC) network, or the splitting of the various layers (e.g., physical layer, Media Access Control (MAC) layer, Radio Link Control (RLC) layer, and PDCP layer), plane splitting (e.g., user plane, control plane, etc.), CU and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service.

Depending on the implementation, access network 105 may include one or multiple types of network devices, such as access devices 110. For example, access devices 110 may include an eNB, a gNB, an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node. According to an exemplary embodiment, access device 110 includes logic that provides the radio and core integrated layers service, as described herein.

Core network 150 may include multiple networks of multiple types and technologies. According to an exemplary embodiment, core network 150 includes a complementary network of access network 105. For example, core network 150 may be implemented to include a core network of an LTE, LTE-A network, and/or an LTE-A Pro network, a next generation core (NGC) network and/or another type of future generation core network. Core network 150 may include a legacy core network.

Depending on the implementation, core network 150 may include various types of network devices, such as core devices 155. For example, core devices 155 may include a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a mobility management entity (MME), a session management function (SMF), a unified data management (UDM) device, an authentication server function (AUSF), a network slice selection function (NSSF), a network repository function (NRF), a policy control function (PCF), a network exposure function (NEF), and/or an application function (AF). According to other exemplary implementations, core devices 155 may include additional, different, and/or fewer network devices than those described. For example, core devices 155 may include a non-standard and/or proprietary network device. According to an exemplary embodiment, core device 155 includes logic that provides the radio and core integrated layers service, as described herein.

End device 180 includes a device that has computational and wireless communication capabilities. Depending on the implementation, end device 180 may be a mobile device, a portable device, a stationary device, a device operated by a user, or a device not operated by a user. For example, end device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or other types of wireless end nodes. By way of further example, end device 180 may be implemented as a smartphone, a personal digital assistant, a tablet, a netbook, a phablet, a wearable device (e.g., a watch, glasses, etc.), a set top box, an infotainment system in a vehicle, a vehicle support system, a smart television, a game system, a music playing system, or other types of wireless end devices. End device 180 may be configured to execute various types of software (e.g., applications, programs, etc.). The number and the types of software may vary among end devices 180.

End device 180 may support one or multiple RATs (e.g., 4G, 5G, etc.) and various portions of the radio spectrum (e.g., multiple frequency bands, multiple carrier frequencies, licensed, unlicensed, etc.), network slicing, DC service, and/or other types of connectivity services. Additionally, end device 180 may include one or multiple communication interfaces that provide one or multiple (e.g., simultaneous)

connections via the same or different RATs, frequency bands, carriers, network slices, and so forth. The multimode capabilities of end device 180 may vary among end devices 180.

Figure 2A:
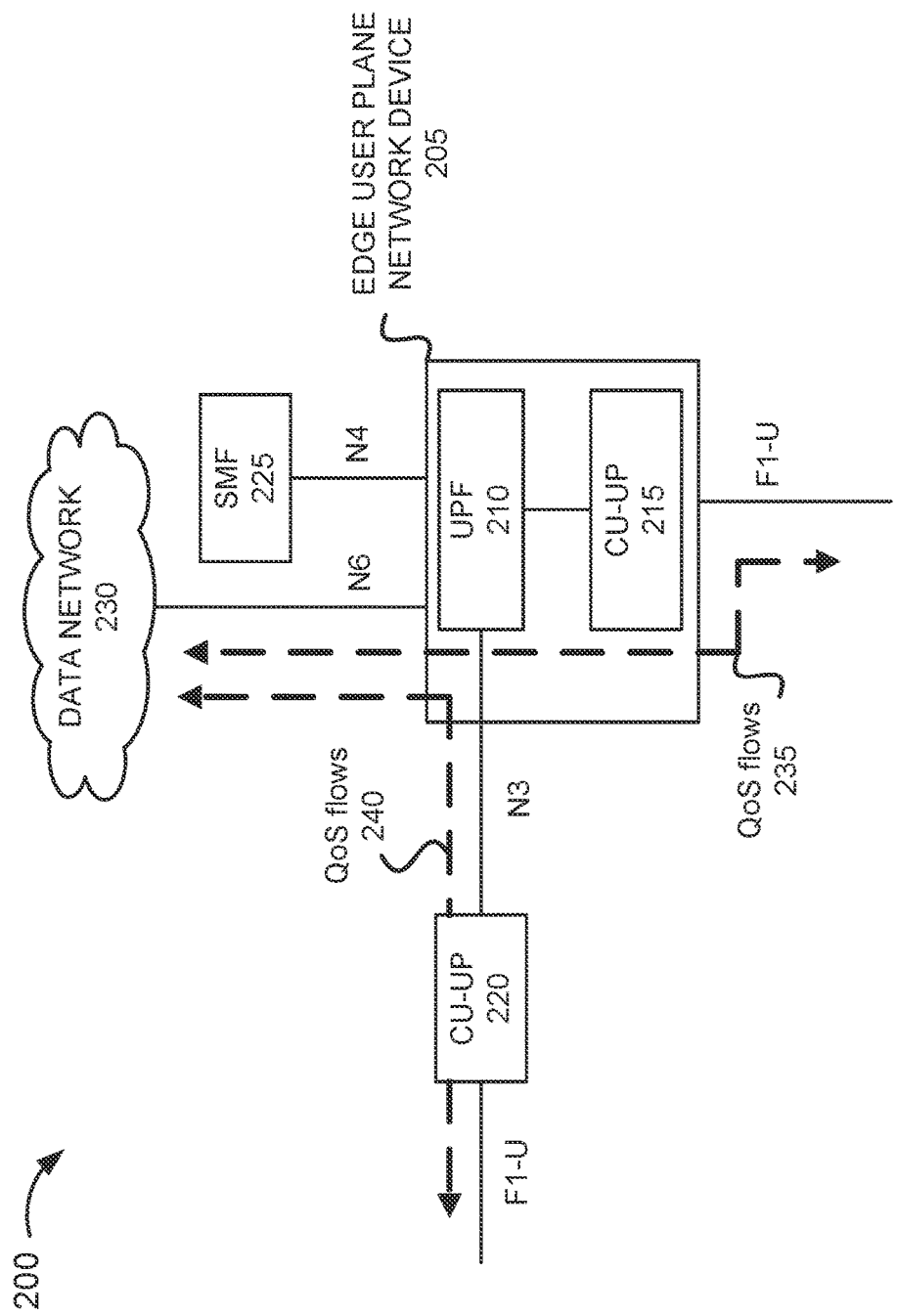
FIG. 2A is a diagram illustrating an exemplary process in which an exemplary embodiment of the radio and core integrated layers service may be implemented.

FIG. 2A is a diagram illustrating an exemplary environment 200 in which an exemplary embodiment of the radio and core integrated layers service may be implemented. As illustrated, environment 200 includes access device 110 and core device 155, such as edge user plane network device 205, a CU-UP 220 and an SMF 225. Edge user plane network device 205 includes a UPF 210 and a CU-UP 215. Environment 200 further includes interfaces N3, N4, N6, and F1-U, as well as a data network 230. In 4G networks, GTP-U tunnels and radio bearers have a 1:1 mapping, whereas 5G networks allow for the mapping of QoS flows to GTP-U tunnels to radio bearers.

Figure 2B:
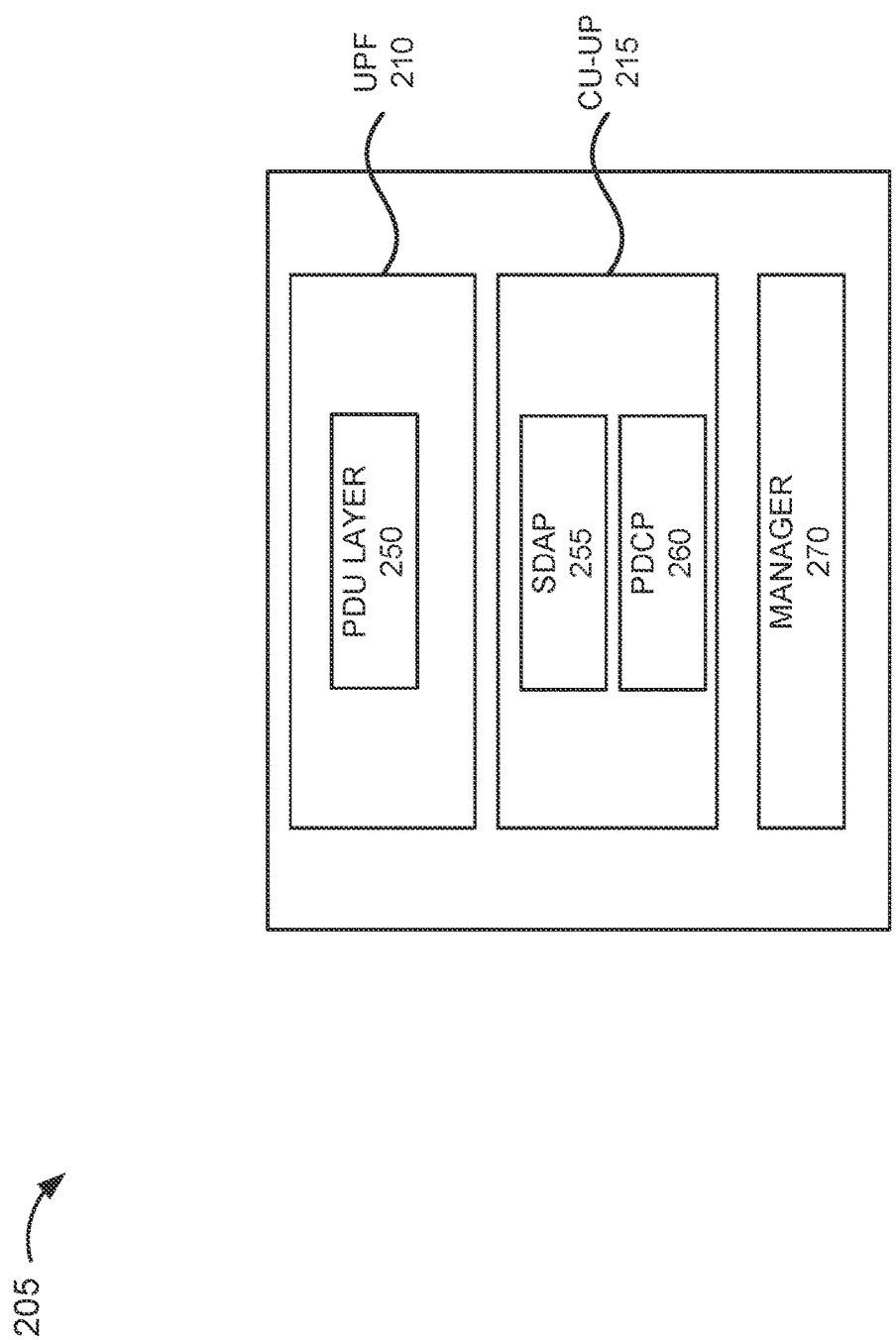
FIG. 2B is a diagram of an exemplary embodiment of an edge user plane network device of FIG. 2A.

Referring to FIG. 2B, UPF 210 includes a PDU layer 250, and CU-UP 215 includes an SDAP layer 255 and a PDCP layer 260. Although not illustrated, UPF 210 and CU-UP 215 include other logic or layers of a protocol stack for the user plane. For example, UPF 210 may include a layer 1, a layer 2, a user datagram (UDP)/Internet Protocol (IP) layer, a UP encapsulation layer, and/or other user plane logic. Additionally, for example, depending on the split option, CU-UP 215 may include a radio link control (RLC) layer, a radio resource control (RRC) layer, and/or other user plane logic. As further illustrated, edge user plane network device 205 may include a manager 270. Manager 270 may include logic that determines whether QoS mapping for a PDU session includes or omits GTP-U mapping based on collocation guidance information, as described herein.

As previously described in relation to environment 100, the number of network devices, the type of network devices, the communication links, and so forth, in environment 200 are exemplary.

Referring back to FIG. 2A, according to an exemplary embodiment, UPF 210 and CU-UP 215 of edge user plane network device 205 may map QoS flows 235 from PDU layer 250 to radio bearers via SDAP 255 and PDCP 260 without GTP-U tunnel mapping. In contrast, according to an exemplary embodiment, UPF 210 of edge user plane network device 205 and CU-UP 220 may map QoS flows from PDU layer 250 to radio bearers with GTP-U tunnel mapping. For example, CU-UP 220 may include GTP-U as a part of its protocol stack, along with other layers (e.g., L1, L2, UDP/IP, etc.). As described herein, edge user plane network device 205 may include logic to determine whether a QoS flow is mapped with or without GTP-U tunneling based on collocation guidance information. Edge user plane network device 205 may transmit the mapped uplink user plane data of QoS flows 235 and 240 via the N6 interface to data network 230. On the other hand, edge user plane network device 205 may transmit the mapped downlink user plane data of QoS flows 235 via the F1-U to a distributed unit-user plane (DU-UP) function (not illustrated), and the mapped downlink user plane data of QoS flows 240 via the N3 interface to CU-UP 220. CU-UP 220 may map QoS flows 240 to GTP-U and a radio bearer.

Figure 3:
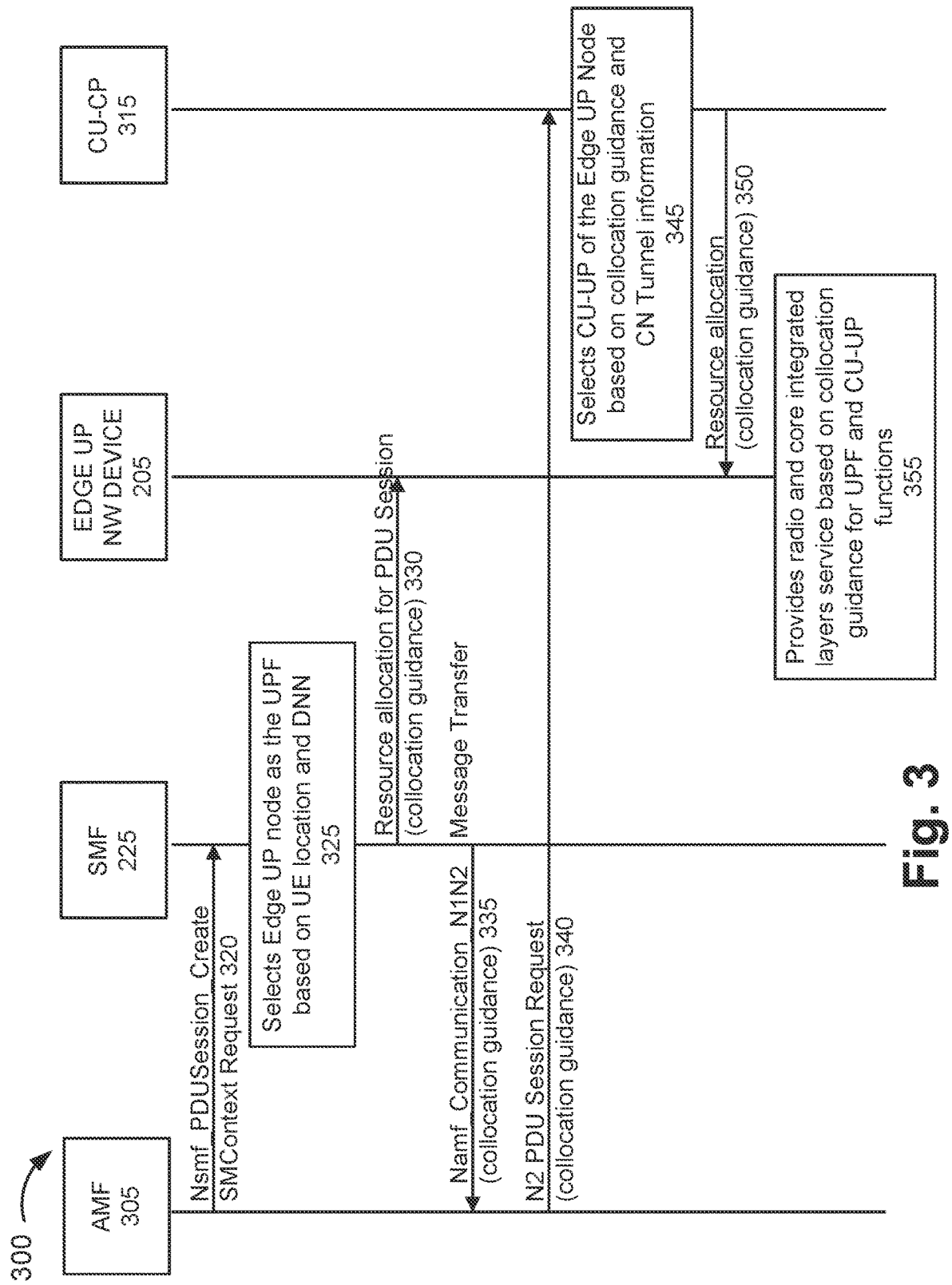
FIG. 3 is a messaging diagram illustrating an exemplary process of an exemplary embodiment of the radio and core integrated layers service.

FIG. 3 is a diagram illustrating an exemplary process 300 of an exemplary embodiment of the radio and core integrated layers service. For example, the messaging diagram relates to an exemplary scenario in which a PDU session is created for end device 180. The messages illustrated and described are exemplary. Additionally, some messages that may be used to establish a PDU session have been omitted for the sake of brevity.

Referring to FIG. 3, in response to receiving a PDU Session Establishment Request from end device 180 (not illustrated), an AMF 305 may generate and transmit a PDU Session Create Context Request message 320. For example, an Nsmf_PDUSession_CreateSMContext Request message may include a Subscription Permanent Identifier (SUPI), Data Network Name (DNN), Single-Network Slice Selection Assistance information (S-NSSAI(s)), a PDU Session Identifier, an AMF identifier, a Request Type, User location information, and other information of such message in accordance with a 3GPP or other governing body standard.

In response to receiving PDU Session Create Context Request message 320, SMF 225 may select edge user plane network device 205 as the UPF based on user location information, DNN information 325 (and other information included in PDU Session Create Context Request message 320). SMF 225 may generate and transmit a message 330, which includes information relating to resource allocation for the PDU session, to edge user plane network device 205. For example, message 330 may include collocation guidance information. The collocation guidance information may indicate the UPF function of edge user plane network device 205 is to be used in support of the PDU session to be created. Additionally, or alternatively, for example, the collocation guidance information may indicate that direct mapping between the PDU layer and the SDAP layer is to be used (e.g., QoS flows 235 of FIG. 2A). According to an exemplary embodiment, SMF 225 may make this determination based on the type of end device application for which the PDU session is being established. Additionally, or alternatively, SMF 225 may make this determination based on other factors, such as network congestion level at a CU-UP and/or other network device of the RAN or core network, subscription information pertaining to end device 180, or other types of context information. Still further, SMF 225 may make this determination based on policies received from a PCF (not illustrated). For example, the polices may relate to a service level agreement (SLA) for the flow, for a network slice or service, and SMF 225 may use this information as a basis to include the collocation guidance in the N4 message. Alternatively, SMF 225 may store and/or use static rules as a basis to determine whether to include collocation guidance information. According to still other exemplary embodiments, SMF 225 may communicate with an NRF (not illustrated) during node selection, and such communication may include information that forms a basis for determining the inclusion or omission of collocation guidance information.

As further illustrated, SMF 225 may generate and transmit a Namf_Communication_N1N2 Message Transfer Response, to AMF 305. Message 335 may include a PDU Session Identifier, N2 SM Information (QoS Profile, core network (CN) Tunnel information, S-NSSAI from the Allowed NSSAI, PDU Session Type, and other information of such message in accordance with a 3GPP or other governing body standard. Additionally, as illustrated, message 335 may include the collocation guidance information. AMF 305 generates and transmits a message 340 to CU-CP 315. For example, an N2 PDU Session Request message, which may include N2 session management (SM) information, a PDU Session identifier, and an N1 SM container (PDU Session Establishment Accept). The N2 PDU Session Request message may include the collocation guidance information.

In response to receiving message 340, CU-CP 315 may select the CU-UP of edge user plane network device 205 based on the collocation guidance and CN tunnel information 345. Based on this selection, CU-CP 315 may generate and transmit a message 350, which includes information relating to resource allocation for the PDU session, to edge user plane network device 205. For example, message 350 may include collocation guidance information. The collocation guidance information may indicate the CU-UP function of edge user plane network device 205 is to be used in support of the PDU session to be created. Additionally, or alternatively, for example, the collocation guidance information may indicate that direct mapping between the PDU layer and the SDAP layer is to be used (e.g., QoS flows 235 of FIG. 2A). In response to receiving message 350, edge user plane network device 205 provides the radio and core integrated layers service based on the collocation guidance information for UPF and CU-UP functions 355. For example, according to this exemplary scenario, edge user plane network device 205 may provide QoS mapping without GTP-U (e.g., QoS flow 235 of FIG. 2A) based on a direct plug-in of PDU and SDAP layers for uplink and downlink data in the user plane.

FIG. 3 illustrates an exemplary process of the radio and core integrated layers service, however, according to other exemplary embodiments, the process may include additional, different, and/or fewer steps, and/or include additional, different, and/or fewer messages. For example, according to another exemplary scenario, edge user plane network device 205 may provide QoS mapping with GTP-U based on the collocation guidance information for UPF and CU-UP functions.

Figure 4:
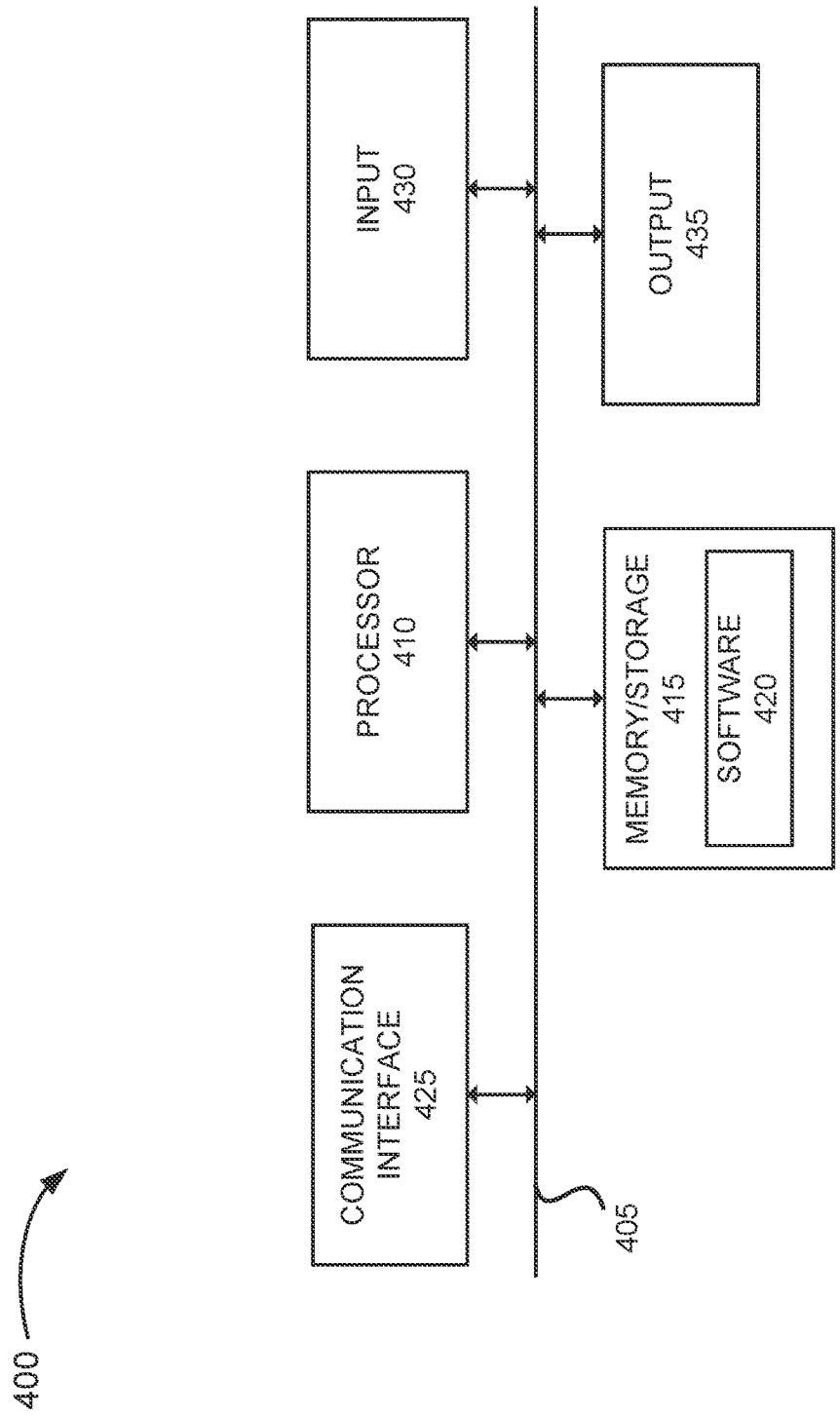
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to components included in access devices 110, core devices 155, end device 180, edge user plane network device 205, UPF 210, CU-UP 215 and/or other devices described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with respect to access device 110 (e.g., gNB 207, etc.), software 420 may include an application that, when executed by processor 410, provides a function of the radio and core integrated layers service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process and/or a function, as described herein, based on the execution of hardware (processor 410, etc.).

Figure 5:
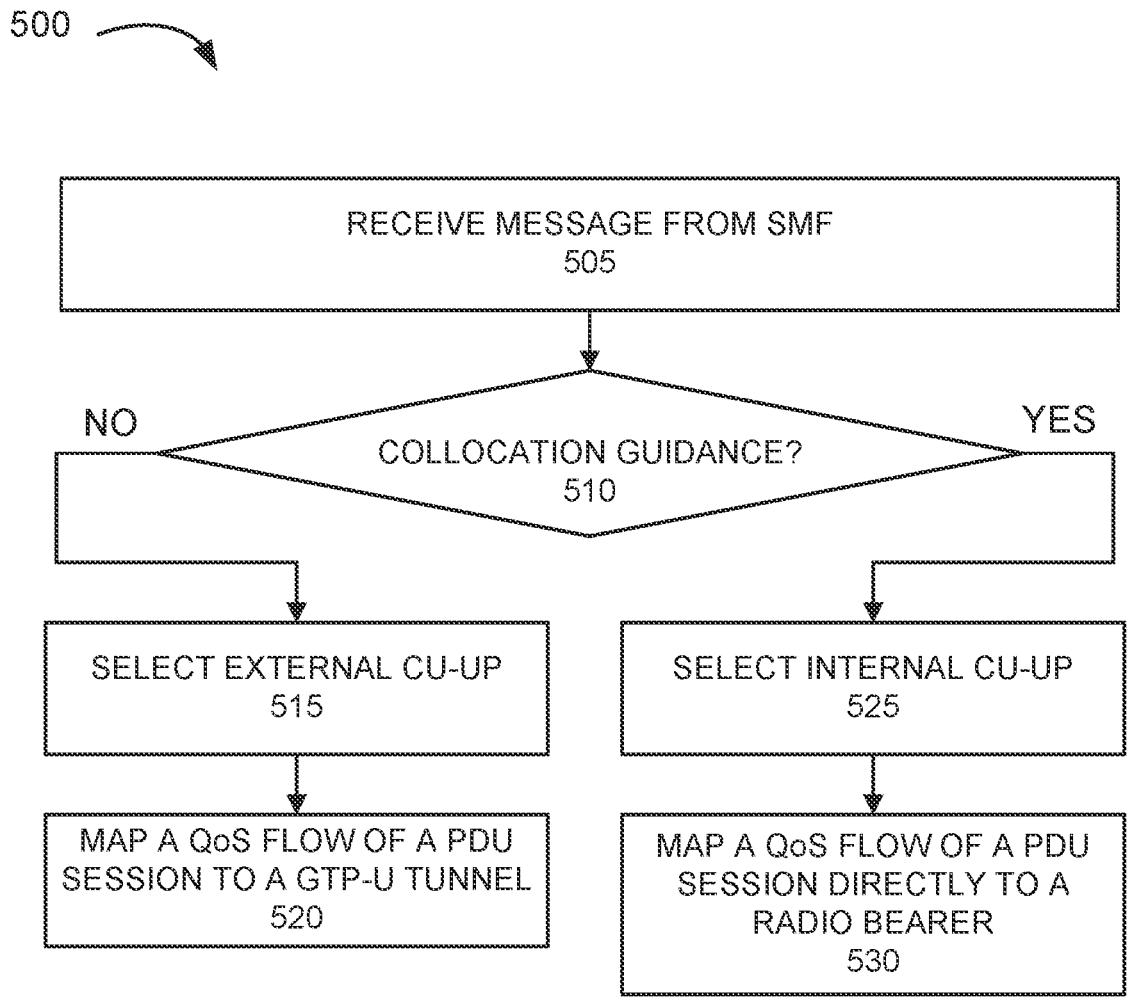
FIG. 5 is a flow diagram illustrating an exemplary process of an exemplary embodiment of the radio and core integrated layers service.

FIG. 5 is a flow diagram illustrating an exemplary process 500 of an exemplary embodiment of the radio and core integrated layers service. According to an exemplary embodiment, edge user plane network device 205 (or a component thereof, such as manager 270) may perform a step of process 500. Additionally, for example, processor 410 may execute software 420 to perform a step illustrated in FIG. 5 and described herein. Additionally, or alternatively, a step illustrated in FIG. 5 may be performed by execution of only hardware.

In block 505, a message from an SMF is received. Edge user plane network device 205 may receive a message pertaining to an establishment of a PDU session for end device 180. For example, the message may include a resource allocation message.

In block 510, it may be determined whether collocation guidance information is included in the message. For example, edge user plane network device 205 may read and analyze the message to determine whether the collocation guidance information is included in the message.

When it is determined that the collocation guidance information is not included in the message (block 510-NO), an external CU-UP is selected (block 515). For example, edge user plane network device 205 may omit to use an internal CU-UP, and select an external CU-UP (e.g., CU-UP 220) for the PDU session. Edge user plane network device 205 may also select a UPF function that interfaces with the external CU-UP via an N3 interface.

In block 520, a QoS flow of a PDU session may be mapped to a GTP-U tunnel. For example, based on the selection of the external CU-UP, and subsequent to the establishment of the PDU session, UPF 210 may map a QoS flow of the PDU session to the GTP-U tunnel in the downlink and/or map the GTP-U tunnel to the PDU session in the uplink.

When it is determined that the collocation guidance information is included in the message (block 515—YES), an internal CU-UP is selected (block 525). For example, edge user plane network device 205 may select to use an internal CU-UP (e.g., CU-UP 215) for the PDU session. Edge user plane network device 205 may also select a UPF function that interfaces directly with SDAP layer 255 of CU-UP 215.

In block 530, a QoS flow of a PDU session may be mapped to a radio bearer. For example, based on the selection of the internal CU-UP, and subsequent to the establishment of the PDU session, UPF 210 may map a QoS flow of the PDU session to the radio bearer in the downlink and/or map the radio bearer to the PDU session in the uplink. As previously described, intermediary GTP-U mapping may be omitted.

FIG. 5 illustrates an exemplary process 500 of the radio and core integrated layers service, however, according to other embodiments, process 500 may include additional operations, fewer operations, and/or different operations than those illustrated in FIG. 5, and described herein. For example, edge user plane network device 205 may select an external CU-UP or an internal CU-UP in response to receiving a message, which may include or not include the collocation guidance information, from a CU-CP, as previously described.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to a process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, by a network device, a message pertaining to an establishment of a packet data unit (PDU) session;
   selecting, by the network device based on the message, a user plane function and a central unit-user plane function; and
   mapping, by the user plane function and the central unit-user plane function, a quality of service flow to the PDU session directly with a radio bearer and without an intermediary mapping of a user plane tunnel.

2. The method of claim 1, wherein the mapping comprises mapping the quality of service flow between a PDU layer and a Service Data Adaptation Protocol (SDAP) layer.

3. The method of claim 1, wherein the message includes collocation guidance information indicating to use direct mapping between a PDU layer and a Service Data Adaptation Protocol (SDAP) layer.

4. The method of claim 1, further comprising:
   determining, by the network device based on the message, whether the quality of service flow is mapped or not mapped to the user plane tunnel.

5. The method of claim 1, wherein the user plane tunnel includes a General Packet Radio Service Tunneling Protocol User Plane (GTP-U) tunnel.

6. The method of claim 1, wherein the user plane tunnel is for uplink and downlink user plane data.

7. The method of claim 1, further comprising:
   transmitting, by the network device after the mapping, downlink user plane data of the quality of service flow to a distributed unit-user plane function.

8. The method of claim 1, further comprising:
   transmitting, by the network device after the mapping, uplink user plane data of the quality of service flow to a data network.

9. A network device comprising:
   a processor configured to:
   receive a message pertaining to an establishment of a packet data unit (PDU) session;
   select, based on the message, a user plane function and a central unit-user plane function; and
   map, by the user plane function and the central unit-user plane function, a quality of service flow to the PDU session directly with a radio bearer and without an intermediary mapping of a user plane tunnel.

10. The network device of claim 9, wherein the mapping comprises mapping the quality of service flow between a PDU layer and a Service Data Adaptation Protocol (SDAP) layer.

11. The network device of claim 9, wherein the message includes collocation guidance information indicating to use direct mapping between a PDU layer and a Service Data Adaptation Protocol (SDAP) layer.

12. The network device of claim 9, wherein the processor is further configured to:
   determine, based on the message, whether the quality of service flow is mapped or not mapped to the user plane tunnel.

13. The network device of claim 9, wherein the user plane tunnel includes a General Packet Radio Service Tunneling Protocol User Plane (GTP-U) tunnel.

14. The network device of claim 9, wherein the user plane tunnel is for uplink and downlink user plane data.

15. The network device of claim 9, wherein the processor is configured to:
   transmit, after the mapping, downlink user plane data of the quality of service flow to a distributed unit-user plane function.

16. The network device of claim 9, wherein the processor is configured to:
   transmit, after the mapping, uplink user plane data of the quality of service flow to a data network.

17. A non-transitory computer-readable storage medium storing instructions executable by a processor of a network device, which when executed cause the network device to:
   receive a message pertaining to an establishment of a packet data unit (PDU);
   select, based on the message, a user plane function and a central unit-user plane function; and
   map, by the user plane function and the central unit-user plane function, a quality of service flow to the PDU session directly with a radio bearer and without an intermediary mapping of a user plane tunnel.

18. The non-transitory computer-readable storage medium of claim 17, wherein the mapping comprises mapping the quality of service flow between a PDU layer and a Service Data Adaptation Protocol (SDAP) layer.

19. The non-transitory computer-readable storage medium of claim 17, wherein the message includes collocation guidance information indicating to use direct mapping between a PDU layer and a Service Data Adaptation Protocol (SDAP) layer.

20. The non-transitory computer-readable storage medium of claim 17, wherein the instructions to further comprise instructions, which when executed cause the network device to:

determine, based on the message, whether the quality of service flow is mapped or not mapped to the user plane tunnel.

\* \* \* \* \*